US009404524B2

(12) United States Patent
Pritchard

(10) Patent No.: US 9,404,524 B2
(45) Date of Patent: Aug. 2, 2016

(54) HIGH PERFORMANCE THREAD ROLLING SCREW/BOLT FOR USE IN AN UNTHREADED NUT ANCHOR

(71) Applicant: CONTI FASTENERS AG, Baar (CH)

(72) Inventor: Alan Pritchard, Cornwall (GB)

(73) Assignee: Conti Fasteners, Baar (CH)

( * ) Notice: Subject to any disclaimer, the term of this patent is extended or adjusted under 35 U.S.C. 154(b) by 39 days.

(21) Appl. No.: 14/333,089

(22) Filed: Jul. 16, 2014

(65) Prior Publication Data

US 2015/0023761 A1 Jan. 22, 2015

Related U.S. Application Data

(60) Provisional application No. 61/856,218, filed on Jul. 19, 2013.

(51) Int. Cl.
 *F16B 25/00* (2006.01)
 *F16B 33/02* (2006.01)

(52) U.S. Cl.
 CPC ............. *F16B 33/02* (2013.01); *F16B 25/0021* (2013.01); *F16B 25/0047* (2013.01)

(58) Field of Classification Search
 CPC .. F16B 25/00; F16B 25/0021; F16B 25/0036; F16B 25/0047; F16B 25/0057; F16B 25/0073; F16B 33/02
 USPC .......................................... 411/411, 413, 415
 See application file for complete search history.

(56) References Cited

U.S. PATENT DOCUMENTS

| 1,369,156 | A | * | 2/1921 | Woodward | F16B 39/30 411/307 |
| 2,788,046 | A | * | 4/1957 | Rosan | F16B 33/02 285/92 |
| 3,195,196 | A | | 7/1965 | Carisi | |
| 3,323,402 | A | * | 6/1967 | Gowen, Jr. | B21H 3/02 411/411 |
| 3,394,626 | A | * | 7/1968 | Oliver | F16B 33/02 411/411 |
| 3,590,409 | A | * | 7/1971 | Bergere | B21H 3/02 470/21 |
| 4,549,754 | A | * | 10/1985 | Saunders | F16L 15/06 285/334 |
| 4,799,844 | A | * | 1/1989 | Chuang | E21B 17/0426 285/334 |

(Continued)

FOREIGN PATENT DOCUMENTS

WO WO-2009/023168 A1 2/2009

OTHER PUBLICATIONS

Notification of Transmittal of the International Search Report and the Written Opinion of the International Searching Authority, or the Declaration, International Application Serial No. PCT/EP2014/065384, filed Jul. 17, 2014, mailed Oct. 17, 2014, 9 pages.

(Continued)

*Primary Examiner* — Roberta Delisle
(74) *Attorney, Agent, or Firm* — Cesari and McKenna LLP

(57) ABSTRACT

The present invention provides a screw/bolt thread profile geometry that is particularly suited to forming a mating nut thread when the screw is inserted in to a plain diameter hole, in the anchor and rotated in a manner by which the thread helix angle will cause the relative axial forward movement, of the screw/bolt, into the anchor. This rotation and relative axial movement will be the prime mover in developing the nut thread that has mating contact with the screw/bolt thread.

10 Claims, 2 Drawing Sheets

(56) References Cited

U.S. PATENT DOCUMENTS

| | | | | |
|---|---|---|---|---|
| 4,861,210 A | * | 8/1989 | Frerejacques | F16B 33/02 285/334 |
| 5,163,523 A | * | 11/1992 | Yousef | F16B 33/02 175/320 |
| 5,413,445 A | * | 5/1995 | Cartellone | F16G 15/08 294/89 |
| 5,722,808 A | * | 3/1998 | Pritchard | F16B 33/02 411/366.3 |
| 5,800,107 A | * | 9/1998 | Giannuzzi | F16B 25/00 411/386 |
| 6,467,818 B1 | * | 10/2002 | Snapp | E21B 17/042 285/334 |
| 6,494,655 B1 | | 12/2002 | Pritchard | |
| 6,848,724 B2 | * | 2/2005 | Kessler | F16L 15/004 285/333 |
| 7,416,374 B2 | * | 8/2008 | Breihan | F16B 33/02 285/334 |
| 7,731,466 B2 | * | 6/2010 | Shea | F16B 39/30 411/308 |

OTHER PUBLICATIONS

Dehaitre, Lon, "Thread Rolling Screw Advantages," American Fastener Journal, Nov./Dec. 2003, pp. 6-7.

No Listed Author, "The Heritage of Mechanical Fasteners Part Two," Fasteners, Fall 1970, pp. 3-7.

* cited by examiner

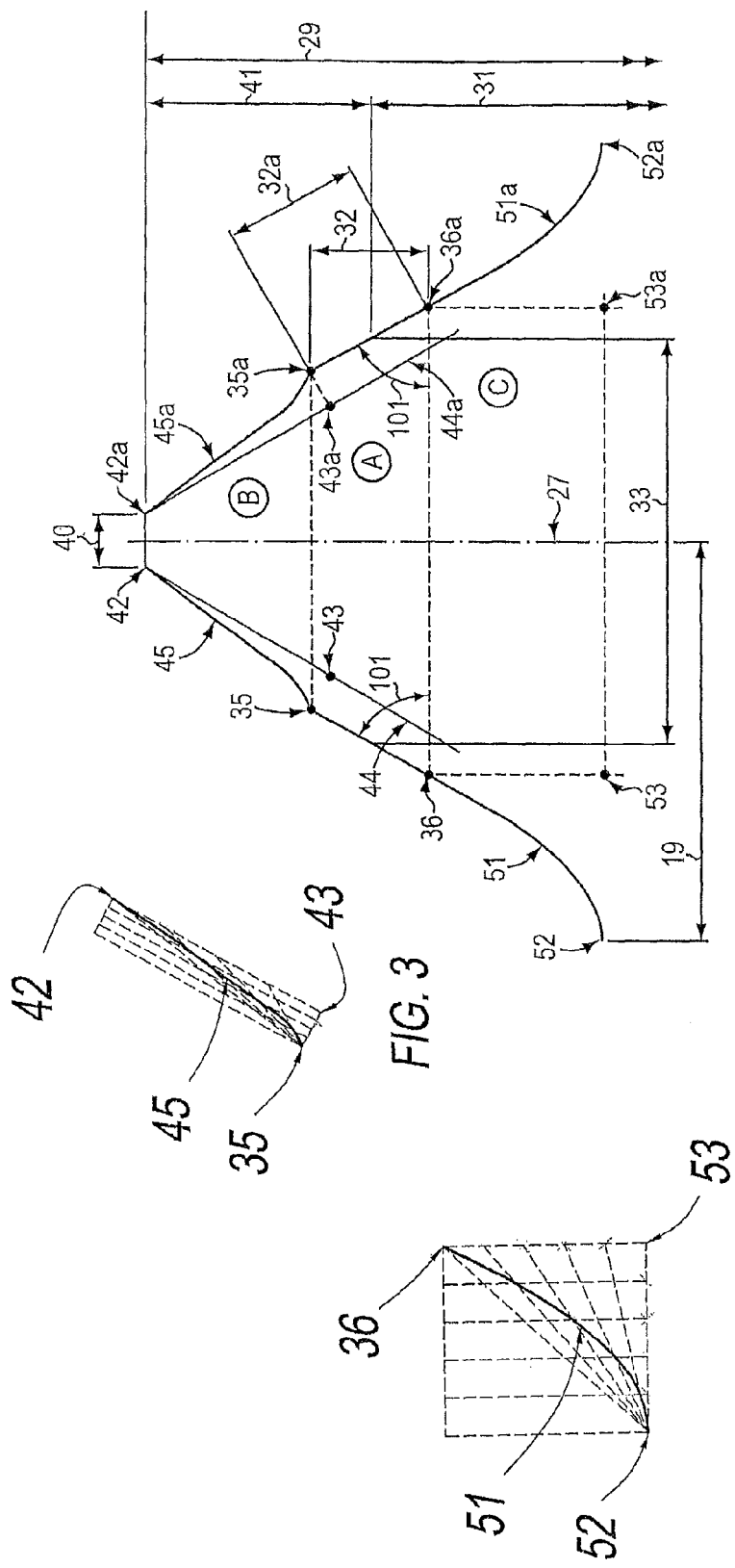

HIGH PERFORMANCE THREAD ROLLING SCREW/BOLT FOR USE IN AN UNTHREADED NUT ANCHOR

CROSS-REFERENCE TO RELATED APPLICATIONS

The present application claims the benefit of U.S. Provisional Patent Application Ser. No. 61/856,218, which was filed on Jul. 19, 2013, by Alan Pritchard for a HIGH PERFORMANCE THREAD ROLLING SCREW/BOLT FOR USE IN AN UNTHREADED NUT ANCHOR and is hereby incorporated by reference.

FIELD OF THE INVENTION

This invention relates to a novel screw thread profile geometry that has particular benefits when used on a high performance thread rolling screw that is inserted into an unthreaded nut anchor, of a ductile material, to affect an assembly.

BACKGROUND OF THE INVENTION

High Performance Thread Rolling Screws were first introduced into the market in the 1960's to provide a means for tapping a mating nut thread, in steel and light alloy anchors, where the thread formed in the anchor, would equate to that produced by the more conventional thread tapping or thread forming technologies associated with standard machine screw/nut threads. The screw, when inserted into the assembly, would remain as an integral part of the finished assembly. This system being similar, in many ways, to the self-tapping screws that were introduced in the 1930's for assembling sheet metal structures. The difference between the two systems being that the 'High Performance Thread Rolling Screws' would produce mating nut threads that were equivalent to specified 'machine screw standards' and could be used in anchors that had thicknesses that were in excess of 2 times the nominal screw diameter. This feature had not usually been available with the 1930's, self-tapping screws.

Many enhancements have been made to the original design concept for 'high performance thread rolling screws' in that industry, having recognized the in-place-cost-saving advantages, of such products, were requesting benefits over and above those envisaged when the 1960's version was introduced.

Many patents have been issued, worldwide, that highlight the inventive nature of the on-going approaches that have been taken to meet industry demands for this type of product. U.S. issued patents, that met the need for enhancement include, inter alia, U.S. Pat. No. 5,722,808, entitled THREADED FASTENER SYSTEM, issued on Mar. 3, 1998, by Alan Pritchard, the contents of which are hereby incorporated by reference.

SUMMARY OF THE INVENTION

Accordingly, it is the object of the present invention to provide a screw/bolt thread profile geometry that is particularly suited to forming a mating nut thread when the screw is inserted in to a plain diameter hole, in the anchor and rotated in a manner by which the thread helix angle will cause the relative axial forward movement, of the screw/bolt, into the anchor. This rotation and relative axial movement will be the prime mover in developing the nut thread that has mating contact with the screw/bolt thread.

The novel thread profile design differs from other known designs used in high performance thread rolling screws in that it is constructed of three defined zones or sections that each perform their own function, during the nut thread forming process, yet act in tandem to give benefits that are over and above other known systems. The thread profile of the present invention is symmetrical about an imaginary line that is perpendicular to the axis of the screw/bolt.

The mid-section, of the thread profile, defined as ZONE 'A' (FIG. 2), is developed around a selected, basic pitch diameter, of a machine screw style thread plus a selected 'fundamental deviation'. The selected values can be those accepted as a standard for M profile threads, U.N.C. threads, U.N.F. threads or any other standard that is seen as applicable to a particular need. The height, of ZONE 'A' is equally spaced above and below this datum so as to produce a section of trapezoidal geometry. The magnitude, of the height of the trapezium, will illustratively be in the order of 1.5 to 3 times the pitch diameter tolerance that is selected for a particular fastener thread. The angle of the trapezium is that relating to the specific chosen standard. For M profile and Unified threads, this angle is 60°.

The tip section, of the thread profile, defined as ZONE 'B' (FIG. 2), is developed from the use of parabola. The parabola, for both sides of the outer section, being constructed from the outer periphery and tip width of the thread, in association with the point at which the top/outer point of ZONE 'A' terminates. The position of these points of determination will developed with reference to FIG. 2 and FIG. 3.

The root section, defined as ZONE 'C' (FIG. 2), is developed from the use of hyperbola. The hyperbola, for both sides of the inner thread zone, being constructed from the inner/outer point of ZONE 'A' and the point at which the thread root coincides with the centre of the space between the threads.

It is initially claimed that the development of the parabola, for the outer tip (Zone B) and the hyperbola root section (Zone 'C') use differing start positions from which to develop the respective shapes. The parabola, for the tip is based upon a rectangle that has a side that flows parallel to the side face of the trapezium. The rectangle for the development of the root hyperbola has sides that are perpendicular to the axis of the screw. The purpose of these differences will be show and their innovative use will be described later.

The entry point of the screw/bolt will consist of a defined number of thread pitches that will taper inward toward the point. By virtue of the novel thread profile design, these taper threads will have the parabolic shape, on entry, that is defined as that being ZONE 'B', in the full profile. This geometry will allow for an initial low thread forming torque that will show a controlled increase as the nut thread becomes fully formed. This point thread shape will also assist in avoiding 'cross threading' should the screw/bolt need to removed and re-inserted.

BRIEF DESCRIPTION OF THE DRAWINGS

The above and further advantages of the invention may be better understood by referring to the following description in conjunction with the accompanying drawings in which like reference numerals indicate identical or functionally similar elements:

FIG. 2 is an enlarged sectional view of the innovative thread profile in accordance with an illustrative embodiment of the present invention;

FIG. 3 is a development showing that used to produce the thread tip portion, parabola, in accordance with an illustrative embodiment of the present invention; and FIG. 4 is a development showing the thread root hyperbola, in accordance with an illustrative embodiment of the present invention.

DETAILED DESCRIPTION OF ILLUSTRATIVE EMBODIMENTS

Figure 1:
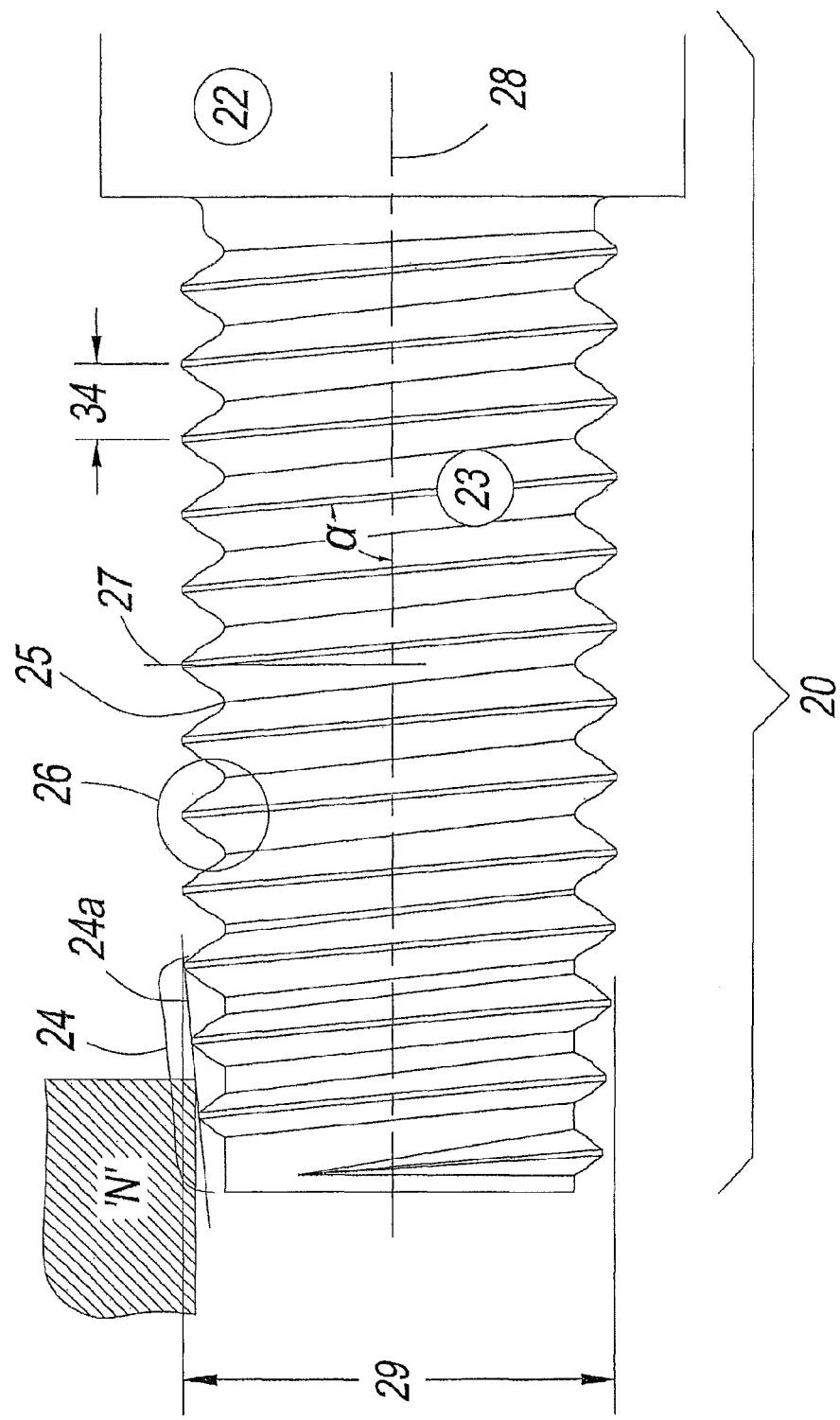
FIG. 1 is a side view of the fastener in accordance with an illustrative embodiment of the present invention.

Referring to FIG. 1 there is shown a thread forming screw/bolt 20, incorporating the innovative thread profile 26 of in accordance with an illustrative embodiment of the present invention. The screw/bolt includes a head 22 with a suitable means for applying relative rotation between the screw/bolt and a nut member 'N' that incorporates a suitable, un-threaded, pilot hole. The threaded shank 23 extends from the underside of the head of the screw/bolt culminating in a tapered lead entry point 24 at the farthest extremity from the head 22. The shank 23 illustratively comprises a lobular cross section area geometry that is of a form defined in U.S. Pat. No. 3,195,196, the contents of which are hereby incorporated by reference. The cross section area may also be, if required, of a circular form. The tapered lead entry point 24 is constructed with a taper 24a to facilitate easy insertion in to the pilot hole in the nut anchor 'N'.

The shank 23 includes a core 25 and a helical thread 26 generated around the core 25. The helical thread 26 being symmetrical about an imaginary line 27 that is perpendicular to the screw/bolt axis 28. The magnitude of the thread helix angle $\alpha$ is a mathematical development from the chosen values for the thread major diameter 29 and the selected thread pitch 34.

Referring to FIG. 2 there is shown the thread profile in greater detail. As can be seen from this drawing the thread 26 comprises 3 zones, A, B and C. Each zone is symmetrical about an imaginary perpendicular 27 to the fastener axis 28 (FIG. 1).

Zone 'A' is the central section of the thread when viewed in cross-section. The zone can be seen as being trapezoidal with side angles 101 being 60° or may be that of the angle specified for a known standard specification that is chosen to suit a specific assembly needs. The diameter 31 is that relating to the chosen basic pitch diameter for the thread plus a selected fundamental deviation. The use of a 'fundamental deviation' above that of the basic pitch diameter, is a novel means to achieve a definite tip profile parabola in the construction when used in association with the tip width 40. The height of the trapezium 32 is equally spaced about the diameter 31. The of height 32 is illustratively a magnitude equal to two times the manufacturing tolerance chosen for the diameter 31, of the helical thread 26 of the fastener. The height of the trapezium can, however, lay within the range 1.3 to 2 times the manufacturing tolerance chosen for the thread pitch diameter 31. The flat face width 31a is mathematically determined from the height 31 and the face angle 101. (As an example: For face angle=60°·31a=31/sin 60).

The width of the trapezoid 33, related to the selected pitch diameter 31, should illustratively equate to one half of the screw axial thread pitch 34, selected for the fastener. The extremities of the trapezoidal zone terminate at points 35, 35a, 36 and 36a. These points provide the relative positions for the starting points for the thread tip Zone 'B' (points 35 and 35a) and the thread root construction, Zone 'C' (points 36 and 36a).

Zone 'B' is seen as being the tip of the thread that has a tip width 40 and a height 41 above the selected pitch diameter of the fastener 31. The tip width 40 is equally spaced about the imaginary perpendicular 27 to the fastener axis 28 and has a illustrative magnitude that equates to one tenth of the selected screw axial pitch. The tip width may, however, lay within the range 0.10 to 0.125 times the selected axial pitch 34. The extremities, of this tip width, are denoted by points 42 and 42a. Two further imaginary points 43 and 43a are positioned perpendicular to and directly related to a parallel 44 and 44a to the side profile faces of Zone 'A'.

The profiles of the tip 45 and 45a are constructed as parabola and complete the Zone 'B', thread profile and tip section. Parabola 45 is constructed between points denoted as 35, 42 and 43 and parabola 45a constructed between points 35a, 42a and 43a. Referring to FIG. 3 there is illustrated the construction of the parabola 45 as is seen between the relative points. Parabola 45a is constructed as a mirror image of parabola 45.

The tip parabola is introduced to provide a controlled flow rate, of the nut anchor material, N, when the fastener is initially inserted and driven to form a mating nut thread. The initial flow rate will be relatively high and will be reduced and controlled under the influence of the parabola as mating thread engagement is achieved. The advantage of this control is aimed toward a more effective method for constructing a mating nut and bolt thread.

The profile faces 51 and 51a of Zone 'C' are constructed as hyperbola. Profile face 51 is constructed between points 36, 52 and 53. Point 52 having a illustrative position that lies on the outer periphery of the fastener core 25 and the mid-point of the selected fastener thread axial pitch 19. Point 53 having a illustrative position that is at the intersection of an imaginary perpendicular line that extends inward from the position denoted as 36 of the profile face of Zone 'A' and its intersection with the periphery of the fastener core 25.

FIG. 4 shows a drawing of the method used for developing the hyperbola at the root of the thread profile. The profile face 51a is constructed as a hyperbola with extremities of 36a, 52a and 53a, which develop a mirror image of the shape outlined in the above paragraph.

The purpose for the root formation to be developed as hyperbola is to assist in the nut material flow at a controlled rate that will improve nut thread formation during the insertion of the high performance thread rolling screw/bolt. A further advantage is that the novel construction of this inventive thread root form will assist in withstanding the potential for fatigue of the screw/bolt to be a serious factor in an assembly.

Whilst there has been described in the foregoing an illustrative embodiment of the present invention it will be understood by those skilled in the technology concerned that many variations or modifications in detail of design or construction may be made without departing from the present invention.

One alternative embodiment of the present invention is to construct the innovative understanding of the present invention such that it gives advantages when the screw is used in the assembly of plastic components. Changes that may be adopted, for this purpose, and with reference to FIG. 2 are:

The thread angle 101 is to lay within the range 65 degrees to 75 degrees. The tip width 40 is selected in accordance with general practices for 'screws to be used in plastic materials'. The imaginary pitch diameter 31 is selected such that it is one half of the height of the thread depth. Such height is constructed by using; screw outside diameter 29 minus screw root diameter 25 and dividing the result by two.

The tip, of the profile (Zone 'B') has a thread face constructed as a hyperbolic curve that uses the defined points 42 and 43 as developed along the imaginary line 44. This imaginary line 44 will now be the angled face profile of the innovative thread for use in plastic materials. The thread form, toward the root of the thread will be as of a hyperbolic curve. By using this method of construction, the width of the thread 33 will be reduced such that it corresponds to the width where the angled face 44 meets the imaginary pitch diameter 31.

It is also understood that the following claims are intended to cover all of the generic and specific features of the invention herein described.

The invention claimed is:

1. A thread rolling fastener, the fastener comprising:
a thread profile being defined by three zones;
wherein an outer zone profile is defined as having thread profile faces constructed as parabola;
wherein a central zone is defined as having profile faces constructed as sides of a trapezium;
wherein an inner zone is defined as having profile faces constructed as hyperbola;
wherein the profile form being developed around a selected basic pitch diameter, the pitch diameter being a selected nominal basic pitch diameter to which is added a selected fundamental deviation, a height of the sides of the trapezium is spaced equally above and below the pitch diameter;
wherein the outer zone parabola is constructed from the upper position of the central trapezium toward the major, outer, diameter of the screw/bolt thread, wherein at the outer diameter there is a tip width at which the parabola terminates, wherein the inner zone hyperbola is constructed from the inner position of the central trapezium and extends toward the minor thread diameter; and
wherein the inner hyperbola extends to the centre between the threads at the point where it contacts the thread minor diameter.

2. A threaded fastener in accordance with claim 1 where the height of the central trapezium is 1.3 times the manufacturing tolerance chosen for the basic pitch diameter plus the selected fundamental deviation.

3. A threaded fastener in accordance with claim 1 where the height of the central trapezium lies within a range of 1.3 to 2 times the tolerance chosen for the basic pitch diameter plus the selected fundamental deviation.

4. A threaded fastener in accordance with claims 1, 2 or 3, where the tip width of the thread profile at its major diameter is 0.10 times the selected thread axial pitch.

5. A threaded fastener in accordance with claims 1, 2 or 3 where the tip width of the thread profile at its major diameter lies within the range of 0.100 to 0.125 times the selected thread axial pitch.

6. A threaded fastener in accordance with claims 1, 2, or 3, where the parabola developed for the outer profile of the thread is generated between the outer point of the tip width and the upper/outer point of the central trapezium.

7. A threaded fastener in accordance with claim 1 where the inner profile of the thread is developed as a hyperbola between the lower/outer point of the central trapezium and the mid position between adjacent threads where that mid position meets the minor thread diameter.

8. A threaded fastener in accordance with claim 1 where the rectangle developed to construct the parabola for the outer surface adjacent to the tip is parallel to the face of the central trapezium.

9. A threaded fastener in accordance with claim 1 where the rectangle to construct the root hyperbola has vertical sides that are perpendicular to the axis of the fastener.

10. A thread rolling fastener having a helical thread profile defined by three zones, the externally threaded fastener comprising: a first zone having a profile defined as having first zone thread profile faces constructed as sides of a trapezium, wherein a profile form is based around a predefined selected basic pitch diameter comprising a selected nominal basic pitch diameter to which is added a predefined fundamental deviation, wherein sides of the trapezium are arranged so that a midpoint of the sides of the trapezium are equally spaced above and below the predefined basic pitch diameter;
a second zone having a profile defined as having second zone thread profile faces constructed as parabola; and
a third zone having a profile defined as having third zone thread profile faces constructed as hyperbola.

\* \* \* \* \*